United States Patent [19]
Mattes et al.

[11] Patent Number: 5,719,734
[45] Date of Patent: Feb. 17, 1998

[54] ELECTRONIC APPARATUS

[75] Inventors: Bernhard Mattes; Ralf Henne, both of Sachsenheim, Germany

[73] Assignees: Morton International, Inc., Chicago, Ill.; Robert Bosch GmbH, Stuttgart, Germany

[21] Appl. No.: 837,066

[22] Filed: Apr. 11, 1997

Related U.S. Application Data

[63] Continuation of Ser. No. 518,769, Aug. 24, 1995, abandoned.

[30] Foreign Application Priority Data

Sep. 16, 1994 [DE] Germany .................. 44 33 045.6

[51] Int. Cl.[6] ............................................. H02H 9/00
[52] U.S. Cl. ................................. 361/56; 361/84
[58] Field of Search .................... 361/54, 56, 84, 361/111, 113; 307/10.1, 10.7

[56] References Cited

U.S. PATENT DOCUMENTS

| | | |
|---|---|---|
| 3,939,363 | 2/1976 | Engel .................... 361/111 |
| 4,259,705 | 3/1981 | Stifter ................... 361/113 |
| 4,520,419 | 5/1985 | Locher et al. ........... 361/56 |
| 4,979,067 | 12/1990 | Foley ...................... 361/56 |

OTHER PUBLICATIONS

Blackburn, John F., *Components Handbook*, 1949, Mcgraw-Hill, pp. 100–109.

Suchowerskyj, W., *Developements in the Field of Shock Detectors*, 1982, Ingenieurs de l'Automobile, Paris, France, No. 6, pp. 69–77, (Translation Provided).

*Primary Examiner*—Jeffrey A. Gaffin
*Assistant Examiner*—Sally C. Medley
*Attorney, Agent, or Firm*—Gerald K. White

[57] ABSTRACT

In the case of an electronic apparatus (1), a protective circuit (10) for positive and negative voltage spikes is provided, which circuit includes two diodes (12, 13). The first diode (12), polarized in the forward direction, is arranged in the positive branch of the voltage supply. The second diode (13), polarized in the reverse direction, is connected, on the one hand, to the cathode connection of the first diode (12) and, on the other hand, to the ground connection.

8 Claims, 1 Drawing Sheet

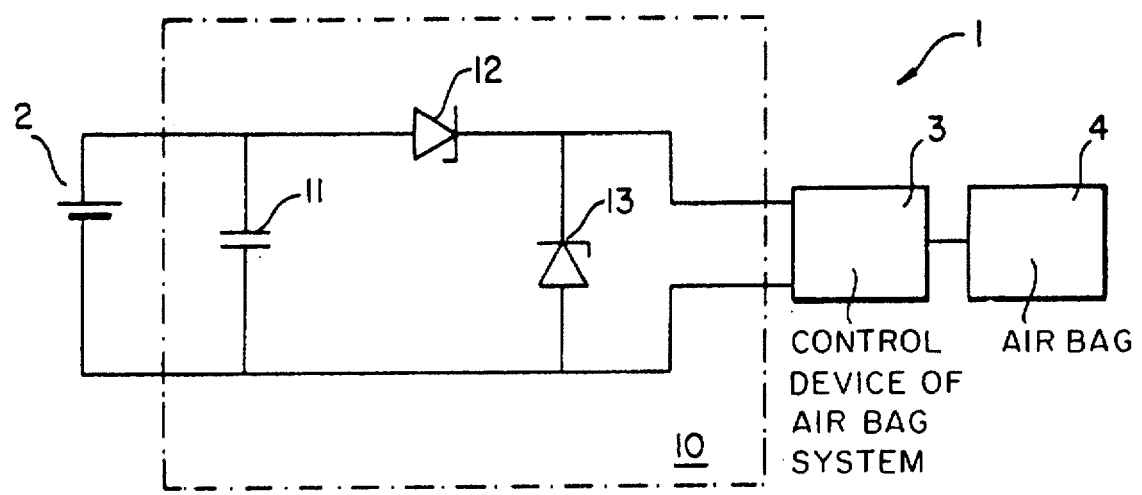

ELECTRONIC APPARATUS

This is a continuation of application Ser. No. 08/518,769 filed on Aug. 24, 1995 now abandoned.

DESCRIPTION OF THE RELATED ART

An electronic apparatus of the generic type is disclosed in the journal 1141 Ingenieur de l'Automobile (1982) No. 6 pp. 69–77. However, details about the protective circuit provided in that case are not specified.

It is further known, for the purpose of protecting electronic devices from overvoltage, to connect so-called varistors (variable, voltage-dependent resistors) between the poles of the supply voltage leads. However, varistors have a relatively large dynamic internal resistance. This internal resistance has a very negative effect in the event of a load dump. In the case of a voltage spike, the supply voltage may rise to values considerably higher than the permissible desired voltage. Therefore, all of the components concerned must be designed for high voltages of this type. However, if this is at all possible, in particular in the case of semiconductor components, use must be made of high-quality, voltage-proof components, which are comparatively expensive. A further disadvantage of varistors is that the wafer diameter of these varistors becomes larger, the smaller the dynamic internal resistance is intended to be.

Varistors which can limit, for example, voltage spikes of the order of magnitude of between 80 and 100 volts to non-critical voltages in the range of approximately 50 volts normally have wafer diameters of about 25 mm and, accordingly, a large space requirement. This is unfavorable for electronic apparatuses in which the aim nowadays is to reduce the space and weight.

A protective circuit comprising a polarity reversal protection diode with a following suppressor diode is further known. However, negative voltage spikes are not limited by a protective circuit of this type. If a capacitor is provided, for example, directly on the plug of the electronic apparatus for the purpose of improving the electromagnetic interference behavior, then said capacitor would break down, and hence be destroyed, in the case of extremely high negative voltage spikes. If a capacitor of this type is not present, the polarity reversal protection diode has to be designed for these high reverse voltages, and this also leads to increased costs.

SUMMARY OF THE INVENTION

The electronic apparatus having the features of claim 1 permits a high strength to resist disadvantageous load dumps. Thus, the proposed apparatus can withstand load dumps of, for example, 90 volts across 1.2 ohms and 120 volts across 2.2 ohms without any disadvantageous consequences. At the same time, protection against voltage spikes in the negative direction is also achieved. Thus, it is possible to cope with voltage spikes of at least minus 1100 volts with an energy of about 4 joules without any damage. Polarity reversal protection is ensured at the same time.

BRIEF DESCRIPTION OF THE DRAWINGS

The drawing shows an exemplary embodiment of the invention which is illustrated as a block diagram.

DETAILED DESCRIPTION OF THE INVENTION

The drawing shows an electronic apparatus 1 with a protective circuit 10. The electronic apparatus 1 includes a battery 2 as the voltage source and a load circuit 3, which is, for example, the control device of an air bag system for vehicle occupants. 4 designates the air bag which can be activated by the control device 3. The battery 2 is then the vehicle battery. A capacitor 11 is connected in parallel with the battery 2. The protective circuit includes a first diode 12, which, polarized in the forward direction, is arranged in the lead connected to the positive pole of the battery 2, and also a second diode 13 which, polarized in the reverse direction, connects the cathode connection of the diode D12 to the ground connection. The diodes 12, 13 are so-called suppressor diodes (Transil diodes). The diodes 12, 13 are expediently selected in such a way that the breakdown voltage of the diode 12 is greater than the breakdown voltage of the diode 13. Thus, in a preferred exemplary embodiment of the invention, the breakdown voltage of the diode 12 is about 20% and the breakdown voltage of the diode 13 is about 10% greater than the desired operating voltage. The protective circuit is used with particular advantage in an air bag system for vehicle occupants, in particular for occupants of commercial vehicles.

The mode of operation of the electronic apparatus is described below. In this case, normal operation is initially regarded as being in the normal vehicle electrical system voltage range between approximately 8 volts and 36 volts. In this case, the first diode 12 is polarized in the forward direction, while the second diode 13 is connected in the reverse direction. A diode having a breakdown voltage of about 39 volts is used, for example, for the second diode 13. As a result, no current flows via the second diode 13 during normal operation. In the case of a load dump, the supply voltage greatly increases, that is to say, for example, starting from the normal operating voltage with its maximum value of about 36 volts to a value of between 80 or 100 volts. In this case, the second diode 13 limits the supply voltage fed to the control device 3 to a safe value of approximately 50 volts. The voltage across the capacitor 11, which is provided for interference suppression purposes, is limited to non-critical values in the region of about 52 volts. In this case, a comparatively large current flows through the first diode 12. However, since this diode 12 is polarized in the forward direction, it is possible, in spite of the high current load, to use a diode of comparatively small design. However, the second diode 13 must absorb the load dump energy and, accordingly, must be dimensioned for a higher load.

In the case of polarity reversal, the first diode 12 blocks reliably up to its breakdown voltage. The breakdown voltage is expediently selected to be larger than the maximum occurring, normal supply voltage (approximately 36 volts), that is to say, for example, between 42 and 44 volts, in particular 43 volts. As a result, the control device 3 which is protected by the protective circuit is reliably protected against polarity reversal.

Comparatively high voltage spikes can occur as interference pulses, in particular, in the vehicle electrical system of commercial motor vehicles. For example, voltage spikes up to −1100 volts with about 4 joules of energy must be expected. In this case, the first diode 12 breaks down, since its breakdown voltage of, for example, 43 volts is exceeded. The second diode 13 is connected in the forward direction with regard to the negative voltage spikes and, accordingly, is conducting. As a result, the voltage occurring across the capacitor 11 is limited to safe values of about −50 volts. The supply voltage fed to the control device 3 is limited to the forward voltage of the diode D2, which is greater than approximately −1 volt. This is safe for the control device 3, however.

The electronic apparatus described represents a simple way of being able to provide overvoltage protection against overvoltages in the positive and negative directions. In this case, both downstream circuit sections, such as, for example, the control device 3 illustrated in the figure, and upstream components, such as, for example, the capacitor 11 provided for suppressing interference pulses, are protected. Since the loads in the case of negative voltage spikes are less than in the case of a load dump, a diode having a smaller loadability may be used as the first diode 12. This does not have any influence on the quality of the load dump protection, however, since this diode is polarized in the forward direction in the case of a load dump and, consequently, has to absorb only a small power loss.

What is claimed is:

1. An electronic apparatus with a protective circuit, the apparatus including a voltage source and a load circuit, wherein the load circuit (10) includes a first transient voltage spike interference pulse suppressor diode (12) which, polarized in the forward direction and having no shunt current diversion, is arranged in the load circuit (10) directly connected to the positive pole of the voltage source (2), and also a second transient voltage spike interference pulse suppressor diode (13) which, polarized in the reverse direction, connects the cathode connection of the first transient voltage spike interference pulse suppressor diode (12) to the ground connection.

2. The electronic apparatus as claimed in claim 1 wherein the breakdown voltage of the first transient voltage spike interference pulse suppressor diode (12) is greater than the breakdown voltage of the second transient voltage spike interference pulse suppressor diode (13).

3. The electronic apparatus as claimed in claim 2,
    including a capacitor connected in parallel with said voltage source for suppressing interference pulses,
    wherein said load circuit includes an upstream section and a downstream section,
    wherein overvoltage protection is provided in the positive and negative directions both downstream and upstream of said load circuit, such, for example, as the electronic apparatus downstream being protected by said protective circuit, and upstream components such as, for example, said capacitor provided for suppressing interference pulses, and
    wherein, since the loads in the case of negative voltage spikes are less than in the case of a load dump, a suppressor diode having a smaller loadability may be used as said first suppressor diode (12) inasmuch as this suppressor diode (12) is polarized in the forward direction in the case of a load dump, and consequently, has to absorb only a small power loss.

4. The electronic apparatus as claimed in one of claims 1, 2, wherein the breakdown voltage of the first transient voltage spike interference pulse suppressor diode (12) is about 20% and the breakdown voltage of the second transient voltage spike interference pulse suppressor diode (13) is about 10% greater than the normal operating voltage.

5. The electronic apparatus as claimed in claim 1 wherein a capacitor (11) is connected in parallel with said voltage source for suppressing transient interference pulses.

6. An electronic apparatus with a protective circuit for positive and negative transient voltage spikes, the apparatus including a voltage source (2) and a load circuit (10), wherein the load circuit (10) includes two transient voltage spike interference pulse suppressor diodes, with the first diode (12) polarized in the forward direction and having no shunt current diversion arranged in the load circuit (10) directly connected to the positive pole of said voltage source (2), and the second diode (13), polarized in the reverse direction, connects the cathode connection of the first diode (12) to the ground connection, wherein the breakdown voltage of the first diode (12) is greater than the breakdown voltage of the second diode (13) and the breakdown voltage of the first diode (12) is about 20% and the breakdown voltage of the second diode (13) is about 10% greater than the normal operating voltage, wherein said load circuit (10) includes a capacitor (11) connected in parallel with said voltage source (2) for suppressing transient interference pulses, and includes a downstream section and upstream components such as said capacitor, wherein during normal operation no current flows via said second diode (13), wherein, in the case of a load dump, however, where the voltage of said voltage source (2) increases more than about 10% starting from the normal operating voltage, said second diode (13) limits the voltage fed to said downstream section to a safe value and the voltage across said capacitor (11) is limited to noncritical values, in which case a comparatively large current flows through said first diode (12), which first diode, however, is polarized in the forward direction, and it is possible, in spite of the high current load, to use a first diode (12) of comparatively small dimension in respect of space and weight, said second diode (13), however, which must absorb the load dump energy therethrough, must be dimensioned, in respect of space and weight, for a higher load, and wherein, in the case of comparatively high transient voltage spikes which can occur as interference pulses, in particular, for example, in the electrical system of commercial motor vehicles where negative transient voltage spikes up to minus 1100 volts with about 4 joules of energy must be expected, said first diode (12) breaks down since its breakdown voltage is exceeded, said second diode (13), being connected in the forward direction with respect to transient negative voltage spikes, is conducting, and as a result, the voltage occurring across said capacitor (11) is limited to a safe value, and the supply voltage fed to the downstream section of said load circuit (10) is limited to a small negative forward voltage of said first diode (12) that is safe for said downstream section of said load circuit (10).

7. An electronic apparatus with a protective circuit, the apparatus including a voltage source and a load circuit, wherein the load circuit (10) includes a first transient voltage spike interference pulse suppressor diode (12) which, polarized in the forward direction and having no shunt current diversion, is arranged in the load circuit (10) directly connected to the positive pole of the voltage source (2), and also a second transient voltage spike interference pulse suppressor diode (13) which, polarized in the reverse direction, connects the cathode connection of the first transient voltage spike interference pulse suppressor diode (12) to the ground connection,
    with the breakdown voltage of said first transient voltage spike interference pulse suppressor diode being larger than the maximum occurring normal voltage of said voltage source, and
    said second transient voltage spike interference pulse suppressor diode being dimensioned for a higher load than said first voltage spike interference pulse suppressor diode.

8. An electronic apparatus as claimed in claim 7 wherein the breakdown voltage of said first mentioned transient voltage spike interference pulse suppressor diode is greater than the maximum occurring normal voltage of the voltage source.

* * * * *